(12) United States Patent
Joeckel (10) Patent No.: US 8,981,609 B2
(45) Date of Patent: Mar. 17, 2015

(54) GENERATOR FOR A WIND ENERGY INSTALLATION AND METHOD FOR ITS PRODUCTION

(75) Inventor: Stephan Joeckel, Saarbruecken (DE)

(73) Assignee: Wind-Direct GmbH, Mannheim (DE)

( * ) Notice: Subject to any disclaimer, the term of this patent is extended or adjusted under 35 U.S.C. 154(b) by 760 days.

(21) Appl. No.: 12/998,926

(22) PCT Filed: Dec. 16, 2009

(86) PCT No.: PCT/DE2009/001794
§ 371 (c)(1),
(2), (4) Date: Aug. 23, 2011

(87) PCT Pub. No.: WO2010/069300
PCT Pub. Date: Jun. 24, 2010

(65) Prior Publication Data
US 2011/0298330 A1    Dec. 8, 2011

(30) Foreign Application Priority Data
Dec. 18, 2008 (DE) .......................... 10 2008 063 783

(51) Int. Cl.
*H02K 21/12* (2006.01)
*F03D 9/00* (2006.01)
*H02K 1/14* (2006.01)
*H02K 1/16* (2006.01)
*H02K 1/18* (2006.01)
*H02K 15/02* (2006.01)
*H02K 7/18* (2006.01)
*H02K 1/20* (2006.01)

(52) U.S. Cl.
CPC ......... *F03D 9/002* (2013.01); *F05B 2220/7068* (2013.01); *H02K 1/148* (2013.01); *H02K 1/16* (2013.01); *H02K 1/185* (2013.01); *H02K 1/20* (2013.01); *H02K 15/022* (2013.01); *H02K 15/024* (2013.01); *Y02E 10/725* (2013.01); *H02K 7/1838* (2013.01)
USPC ......... 310/156.01; 310/216.001; 310/216.004

(58) Field of Classification Search
USPC ............. 310/45, 156.01, 216.1, 216.4, 254.1, 310/216.001, 216.004, 254; 290/44, 55
See application file for complete search history.

(56) References Cited

U.S. PATENT DOCUMENTS

| 4,665,329 | A | 5/1987 | Raschbichler |
| 4,728,382 | A | 3/1988 | Raschbichler |
| 5,844,341 | A * | 12/1998 | Spooner et al. ............... 310/112 |
| 7,154,193 | B2 * | 12/2006 | Jansen et al. .................... 290/55 |
| 7,431,567 | B1 * | 10/2008 | Bevington et al. ......... 416/244 R |
| 2004/0232704 | A1 | 11/2004 | Casazza et al. |

(Continued)

FOREIGN PATENT DOCUMENTS

| DE | 31 103 39 | 9/1982 |
| DE | 44 02 184 | 8/1995 |

(Continued)

*Primary Examiner* — Thanh Lam
(74) *Attorney, Agent, or Firm* — Jordan and Hamburg LLP (57) ABSTRACT

Disclosed is a generator for a wind energy installation having a rotor which has permanent magnets and is directly connected for drive purposes to a blade rotor of the wind energy installation, and having a stator which has an iron core composed of laminates. The generator is formed without the rotor or the stator on the external circumference as a completely surrounding housing, and the laminates of the stator are connected to one another by adhesive bonding and/or welding.

13 Claims, 9 Drawing Sheets

(56) References Cited

U.S. PATENT DOCUMENTS

2006/0071575 A1* 4/2006 Jansen et al. .................. 310/266
2006/0082241 A1* 4/2006 Enomoto et al. ............. 310/216
2007/0292260 A1* 12/2007 Bagepalli et al. ............... 415/14

FOREIGN PATENT DOCUMENTS

| DE | 4437972 A1 * | 4/1996 |
| DE | 102 15 461 | 10/2003 |
| WO | WO-2008/021401 | 2/2008 |

* cited by examiner

GENERATOR FOR A WIND ENERGY INSTALLATION AND METHOD FOR ITS PRODUCTION

BACKGROUND OF THE INVENTION

The invention relates to a generator for a wind energy installation, having a rotor which has permanent magnets and has a direct drive connection to a blade rotor of the wind energy installation, and having a stator which has a laminated iron core, that is to say an iron core formed from laminate parts. The invention also relates to a method for the production of a generator such as this.

Generators in wind energy installations without gearboxes, whose diameter may be more than 5 m, are subjected to a wide range of influences which adversely affect the accuracy of the generator airs gap. Decreases in the gap flux density associated with that lead to reduced torques and losses of the generated electrical power. Furthermore, there is a risk of friction contacts between the rotor and stator.

Not least, the large generator dimensions result in considerable problems in keeping those parts of the iron core which are subject to strong magnetic forces in position while accurately maintaining the air-gap geometry. The production of conventional generators such as these therefore demands a high degree of effort in terms of accurate processing of holding parts, and quality control.

SUMMARY OF THE INVENTION

The invention is based on the object of providing a new generator of the type mentioned initially which, while precisely maintaining the air-gap dimensions, can be produced with less effort than the prior art.

The generator which solves this problem according to the invention is characterized in that the generator is formed without a supporting housing which completely surrounds the rotor or stator on the external circumference, and in that the individual laminate parts of the stator are connected to one another by adhesive bonding and/or welding.

According to the invention, the laminated iron core, with the laminate parts connected to one another, itself carries out a supporting function which ensures accurate maintenance of the air-gap geometry. There are no complex holding devices for the iron core. The generator weight is reduced.

In one preferred embodiment of the invention, the rotor is an internal rotor, and the stator forms an outer ring which surrounds the rotor. The iron core of the stator can advantageously be completely exposed externally, and can be cooled directly by the outside air. On its outside, the iron core expediently has cooling ribs, which are integrally connected to it.

In the preferred embodiment of the invention, the laminated iron core is arranged between a base plate, which faces away from the blade rotor, and a stiffening ring which faces the blade rotor and is coaxial with respect to the base plate and the laminated iron core. In particular, the base plate and the stiffening ring are connected via a plurality of axial supports which rest on the external circumference of the iron core. In addition, as mentioned above, the iron core is exposed on the outside and can be cooled directly. The iron core is advantageously composed of two types of differently shaped laminate segments. In the active area, the laminate segments have axial slots (slots and teeth) for holding the coils of the stator winding. There are no stator teeth in the end winding area, as a result of which there is space for the coil ends. This allows the base plate and the stiffening ring to be designed to be physically very simple.

In a further refinement of the invention, the base plate has a through-opening, which is coaxial with respect to the rotation axis of the rotor, for a shaft carrier, which holds the rotor and the blade rotor and has an attachment flange which can be placed against the edge of the opening.

Instead of being composed of rare-earth material (for example NeFeB), the permanent magnets are preferably composed of a much more cost-effective ferrite material, with a laminated iron core, with laminate parts which are connected to one another by adhesive bonding and/or welding, also being provided for the rotor. Furthermore, the laminate parts of the stator and if appropriate of the rotor are expediently connected to one another by axial bolts.

In one particularly preferred embodiment of the invention, the stator and if appropriate the rotor is or are formed from a plurality of parts, in particular two parts with half parts.

Half parts of the stator and rotor are advantageously interleaved in one another and can be transported in a space-saving manner, in which case they can be connected to one another in a robust form, inter alia by the action of the force of the permanent magnets in the rotor.

In a further refinement of the invention, the iron core of the stator and if appropriate of the rotor are composed of laminate segments which are placed one next to the other and are layered, with the laminate segments of successive laminate layers overlapping.

The iron core is expediently wound in a concentrated form, that is to say the number of winding slots of the laminated iron core, related to the number of poles and phases, is less than 1, with the number of windings being minimized and with overlapping of phase connections being avoided. On the one hand, this minimizes the risk of ground faults or phase shorts, but on the other hand it considerably simplifies splitting of the stator.

In a further refinement of the invention, the generator windings may be composed of aluminum wire rather than copper.

In order to produce the generator as described above, a method is proposed which is characterized in that the parts of the stator including the laminate segments are inserted into a highly precise clamping apparatus, which bounds the iron core on the outside, are connected to one another and to the clamping apparatus, and, together with the clamping apparatus, are subjected to a pressing and impregnating process, and also to a heat treatment, with the heat treatment being used to connect the parts and/or to relieve stresses between the parts.

It is particularly advantageous to use the heat treatment to relieve stresses when, in addition to the parts of the stator, the parts of the rotor are also introduced into said clamping apparatus and are processed like the parts of the stator using the clamping apparatus, with the parts of the stator and if appropriate of the rotor being welded to one another, possibly by separate connection pieces. The heat treatment then relieves the stresses that are produced during welding.

In another embodiment of the method, the parts of the rotor are introduced into a separate clamping apparatus and, like the parts of the stator, are processed aligned on this clamping apparatus.

Those parts of the stator and if appropriate of the rotor which are connected to the relevant clamping apparatus are preferably impregnated with an adhesive agent/resin, and the adhesive agent/resin is cured during the heat treatment. One known method for impregnation of electrical machines is vacuum impregnation, for example as described in DE 102 15 461 A1. In this case, the adhesive agent/resin penetrates into the smallest gaps and completely wets the surface between the laminate parts. In another known method for adhesive bonding of laminated cores, the laminate parts are previously coated either with stove enamel or with a thermosetting plastic adhesive (see for example DE 31 103 39 C2), and are subsequently pressed, with heat being applied.

Expediently, the layers of laminate segments which are placed one next to the other and form the iron core are pressed together by means of an axial bolt or a separate pressing device, before/during connection to the clamping apparatus.

In a further refinement of the invention, both the laminated core of the stator and that of the rotor comprise a plurality of segments which are separated from one another, and are separately adhesively bonded or welded, with the number of segments being at least two, but preferably twelve or eighteen.

The laminated segments of the stator may contain axial stiffening ribs as stiffening elements, which preferably comprise pressed or drawn profiles and, in particular, can be latched into the segments by means of spring forces.

The laminated segments of the rotor may contain adhesively bonded-in and/or welded webs or plates as stiffening elements, to which the stiffening rotor supporting structure is adjacent on the inside, and preferably has adjustment elements for setting an air gap which is as small as possible.

Both the stator and rotor segments are preferably attached to the generator such that, in the event of repair, they can be removed individually and radially outwards from the generator, which apart from this remains in the wind energy installation.

In the event of repair, the stator can preferably be detached from a shaft body which forms a base frame and can be connected to the rotor such that, with the aid of the drive torque of the rotor, it can be rotated to a position which is suitable for removal of the segment and in which the segment to be removed is preferably right at the top.

In a further refinement of the production method according to the invention, those parts of the stator which are connected to the relevant clamping apparatus are provided with the windings before impregnation, and the adhesive bonding of the laminates and the impregnation of the windings are carried out in one process.

The layers of the laminate parts of the stator which are connected to the relevant clamping apparatus may also be fitted with windings, which are secured separately, for example by means of a resin, before adhesive bonding, in such a way that the adhesive bonding of the laminates and the adhesive bonding of the windings in the slots with the laminates are carried out by emerging adhesive in one process, in which case there is no need whatsoever for impregnation in the resin bath.

Those parts of the rotor which are connected to the relevant clamping apparatus may be fitted with the permanent magnets before impregnation, as a result of which the adhesive bonding of the laminates and adhesive bonding of the magnets into the laminated core are carried out in one process.

In particular, the layers of the laminate parts of the rotor which are connected to the relevant clamping apparatus can be fitted with the permanent magnets before they are adhesively bonded, as a result of which the adhesive bonding of the laminates and the adhesive bonding of the permanent magnets in magnet pockets is carried out by emerging adhesive in one process, and there is no need whatsoever for impregnation in the resin bath.

The invention will be explained in more detail in the following text with reference to one exemplary embodiment and the attached drawings, which relate to this exemplary embodiment.

BRIEF DESCRIPTION OF THE DRAWINGS

FIG. 14 shows a perspective illustration of a rotor segment of the wind energy installation as shown in FIGS. 10 to 13, and FIGS. 15 and 16 show detailed illustrations of the rotor segment from FIG. 14.

DESCRIPTION OF THE PREFERRED EMBODIMENTS

Figure 1:
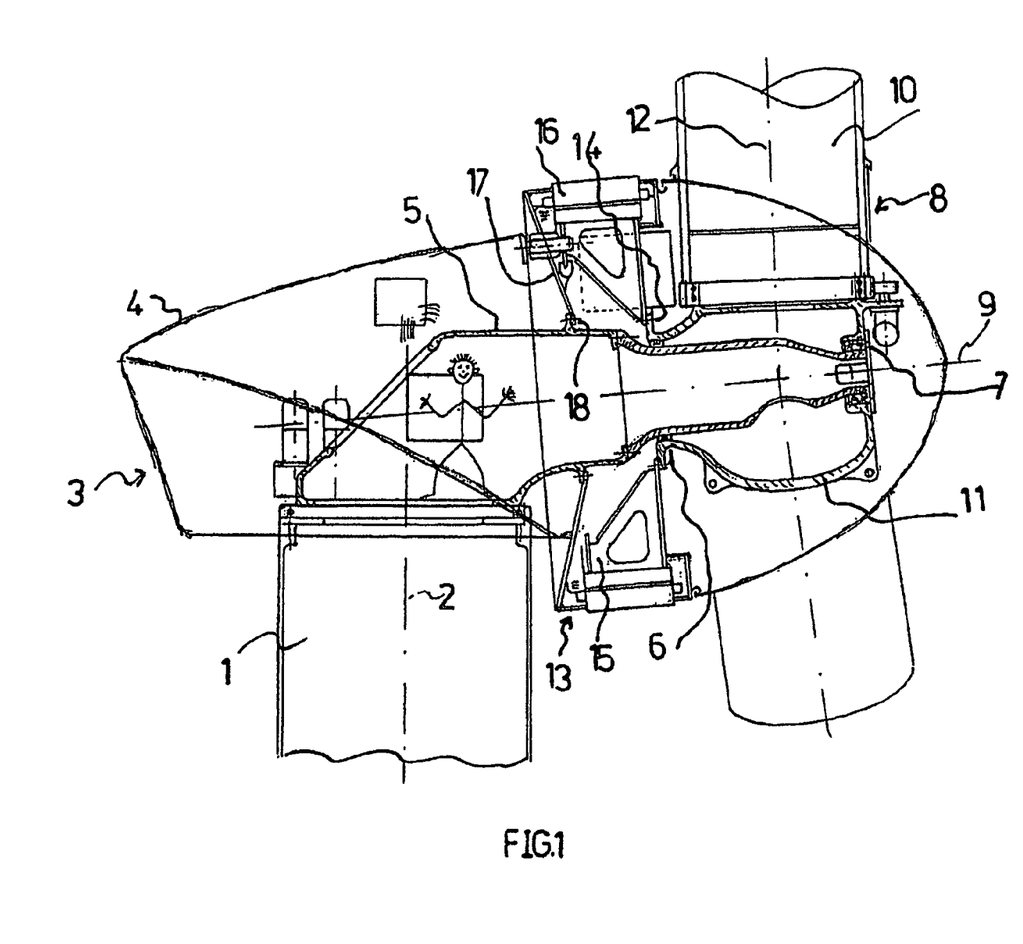
FIG. 1 is an illustration of part of a wind energy installation with a generator according to the invention.

A wind energy installation, a detail of which is illustrated in FIG. 1, has a pod 3 which can be slaved to the wind about an axis 2 on a tower 1, and has a pod housing 4 and a shaft body 5 which is arranged in the pod housing 4.

A blade rotor 8 is mounted at 6 and 7 on the shaft body 5, which can pivot about the axis 2, such that the blade rotor 8 can rotate about an axis 9. Rotor blades 10 of the blade rotor 8 are connected to a hub 11 such that they themselves can rotate about an axis 12 which is approximately at right angles to the rotation axis 9.

A generator 13 is connected directly to the blade rotor 8, and its rotor 15 has a direct drive connection to the blade rotor 8 via a flange 14 on the hub 11.

The rotor 15 forms an internal rotor and is surrounded by an annular stator 16, which is rigidly connected to the shaft body 5 via a base plate 17 and an annular flange 18 which projects from the shaft body 5.

Figure 2:
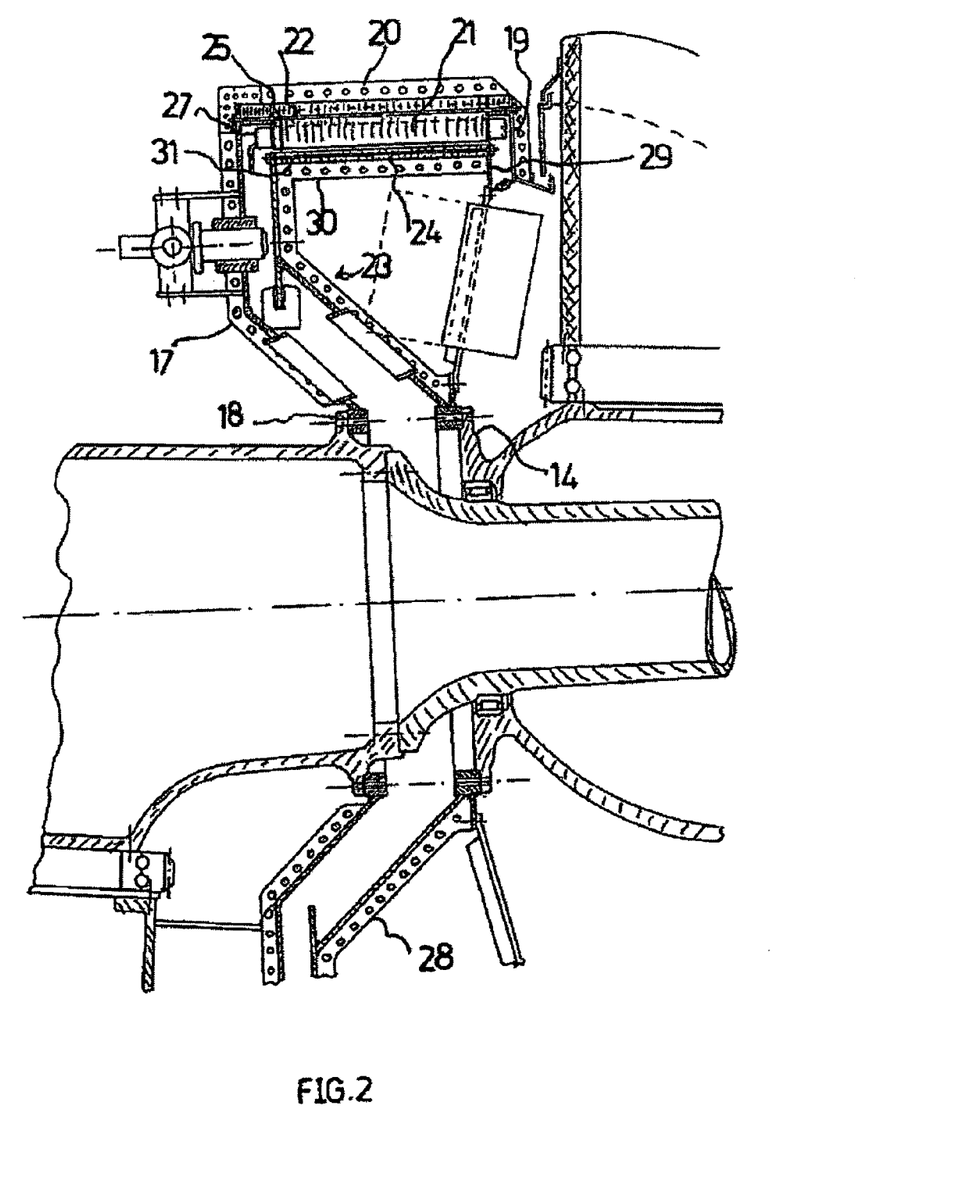
FIG. 2 is an enlarged illustration of part of the view shown in FIG. 1.

As can be seen more clearly in FIG. 2, the stator 16 has a stiffening ring 19 on its side facing away from the base plate 17, which stiffening ring 19 is connected to the base plate 17 via a plurality of axial supports 20. A laminated iron core 21, which rests on the outside against the supports 20, is arranged between the base plate 17 and the stiffening ring 19 and is connected to the base plate 17 and the stiffening ring 19 via axial bolts 22 which pass through the iron core.

Figure 4:
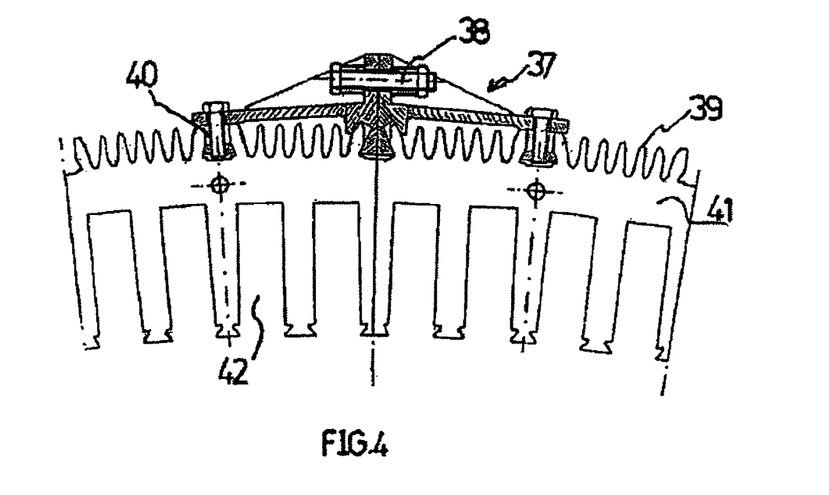
FIG. 4 shows a view of part of the stator as shown in FIG. 3, FIGS. 5 and 6 are illustrations to explain the arrangement of the rotor and stator for transport purposes.

The iron core 21 has axial slots, which can be seen in FIG. 4, for holding the coils of a stator winding 27. The iron core 21 advantageously has two types of differently shaped laminate segments. In the electromagnetically active part, the laminate segments have axial slots (slots and teeth) for holding the coils of the stator winding 27. There are no stator teeth in the end winding areas in front of and behind the active part, as a result of which there is space for the coil ends. This allows the base plate 17 and the stiffening ring 19 to be designed in a physically very simple manner, because no cylindrical components need be shaped and processed.

The rotor 15 has a laminated iron core 24 which is held on a supporting structure 23 and into which permanent magnets 26 (FIG. 8) composed of ferrite material are inserted, which permanent magnets 26 are arranged in holding pockets and are adjacent to an air gap 25 of the generator 13. In addition to a base plate 28, the supporting structure 23 has a stiffening ring 29 and axial supports 30 which rest on the inside against the annular iron core 24. A bolt 31 passes through the iron core 24 and connects it to the base plate 28 and the stiffening ring 29.

Figure 3:
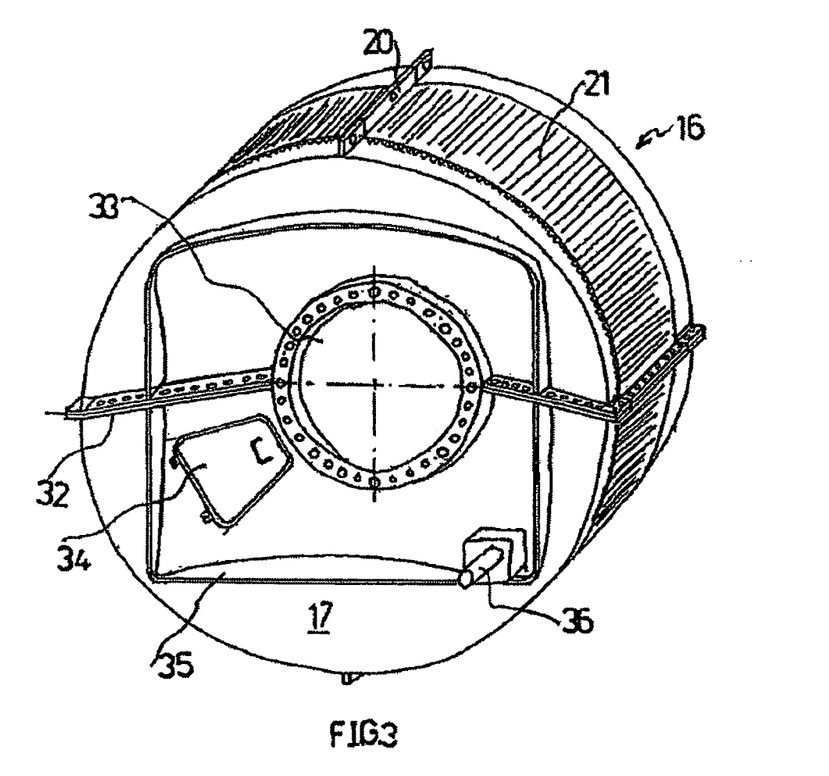
FIG. 3 shows a stator used in the generator according to the invention as shown in FIG. 1.

As can be seen in FIG. 3, which shows the stator 16 separately, the stator 16 is subdivided into halves which can be connected to one another via a flange 32. In addition to a central through-opening 33 for the shaft body 5, an opening is formed in the base plate 17 and can be closed by a flap 34. An opening such as this is also located in the base plate 28 of the rotor 15. Furthermore, the base plate 17 has a circumferential reinforcing rib 35. A locking bolt for the rotor is provided at 36.

FIG. 4 shows a connection device 37 for the iron core 21, which is split into two parts. A screw connection 38 holds the iron core together. As can also be seen from FIG. 4, the iron core has ribs 39 on its outside, which are used for cooling. Undercut slots 40 are formed between ribs 39 at regular intervals, and parts of the connection device 37 can engage in these slots 40. In a corresponding manner, a similar connection device is also required if the iron core of the rotor is split, but in this case on the inside, since this is an internal rotor.

The iron core 21 is assembled from laminate segments 41 which have recesses 42 in order to form slots for holding the stator winding 27.

Figure 5:
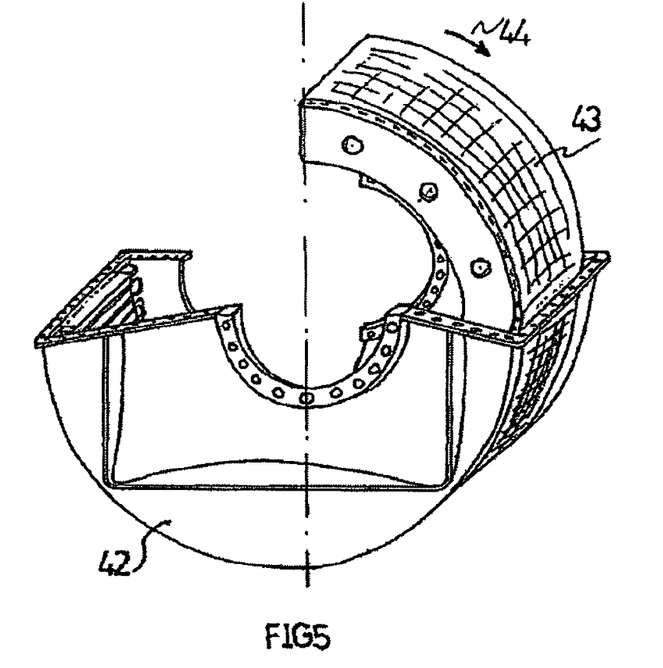
Figure 6:
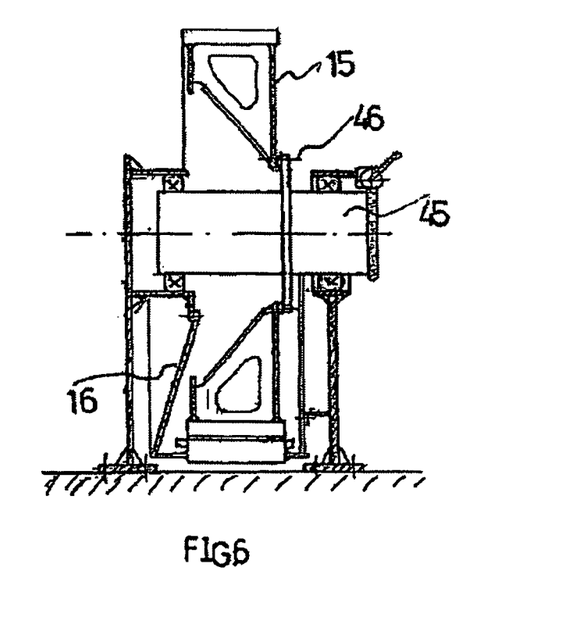

The rotor 15 can also be subdivided into halves, and the halves of the rotor and stator can be interleaved in one another for transportation purposes, as is shown in FIG. 5. For interleaving, one rotor half 43 is inserted in one stator half, turned through 180° as shown by the arrow 44. A rotation apparatus as shown in FIG. 6 with a rotating body 45 and an attachment flange 46 for the rotor is used for this purpose.

Figure 7:
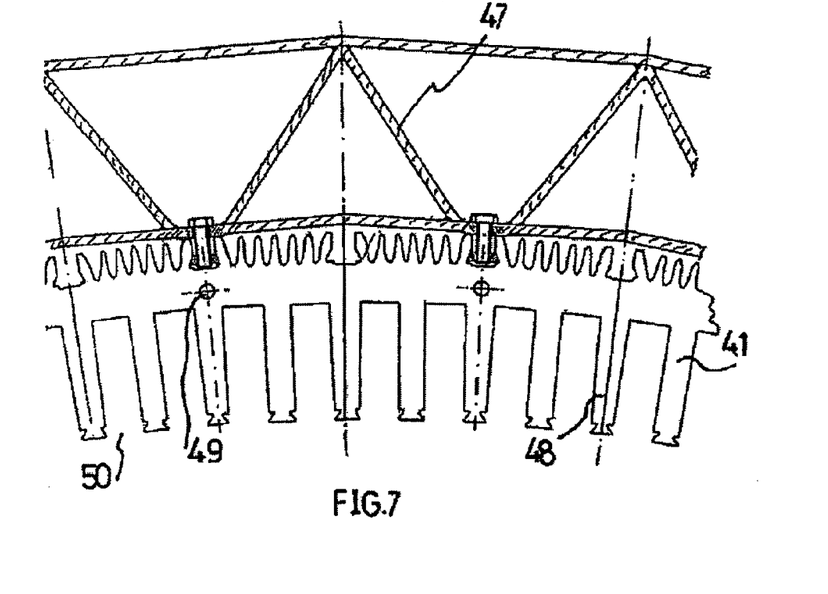
FIGS. 7 and 8 are illustrations to explain the production of the rotor and stator of the generator as shown in FIG. 1.

The production of the generator 13 as described above will be explained in the following text with reference to FIGS. 7 and 8.

The base plate 17 of the stator 16 is inserted into a pot-like clamping apparatus 47, and is attached to it. The diameter of the clamping apparatus corresponds precisely to the external diameter of the iron core 21 of the stator 16.

The iron core 21 is then assembled from the laminate segments 41, aligned with the clamping apparatus 47. The laminate segments 41 in one laminate layer abut against one another at 48. The laminate segments overlap from layer to layer and are geometrically designed such that, in this case, holding slots 50 for the stator winding 27 are created and are distributed uniformly over the circumference, by means of the recesses 42.

When the desired stacking thickness has been reached, the segments are connected to one another by means of the bolts 22 using through-holes 49, and are pressed together between the base plate 17 and the stiffening ring 19. Separate pressing devices could also be used for pressing them together.

Once the stator windings have been introduced into the slots 50 that are formed, the entire arrangement, which comprises the clamping apparatus 47 and the parts of the stator, is impregnated with an adhesive agent, in particular by immersion in an adhesive agent, possibly with the suction effect of a vacuum being used to ensure that the adhesive enters the area between the laminate segments and the intermediate spaces between the windings 27 and walls of the slots 50.

The impregnated arrangement is then heat-treated in an oven, leading to curing of the adhesive agent and to a firm adhesive joint between the stator parts. After the stator has been removed from the clamping apparatus, a final lacquering process or powder coating process is carried out.

Figure 8:
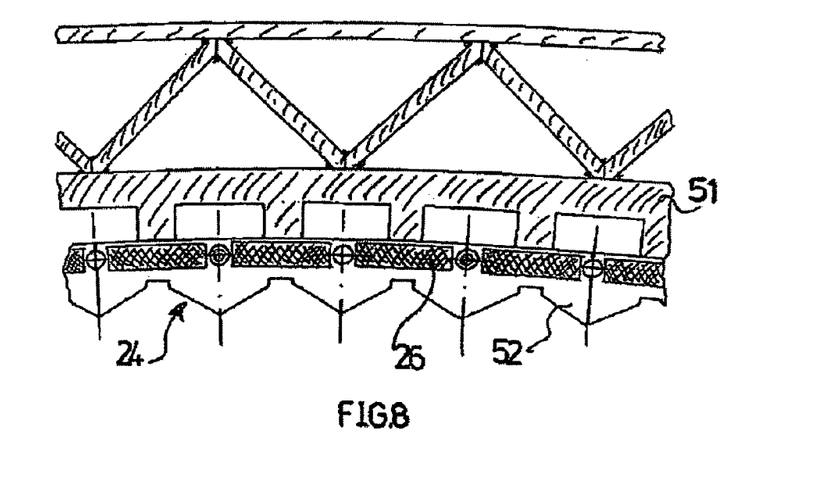

A clamping apparatus 51, a detail of which is illustrated in FIG. 8, is used to produce the rotor 15. In principle, the processes carried out here are the same as those for production of the stator 16. The iron core 24 is assembled from laminate segments 52, and the permanent magnets 26 are inserted into the pockets that are formed in the laminated core.

Figure 9:
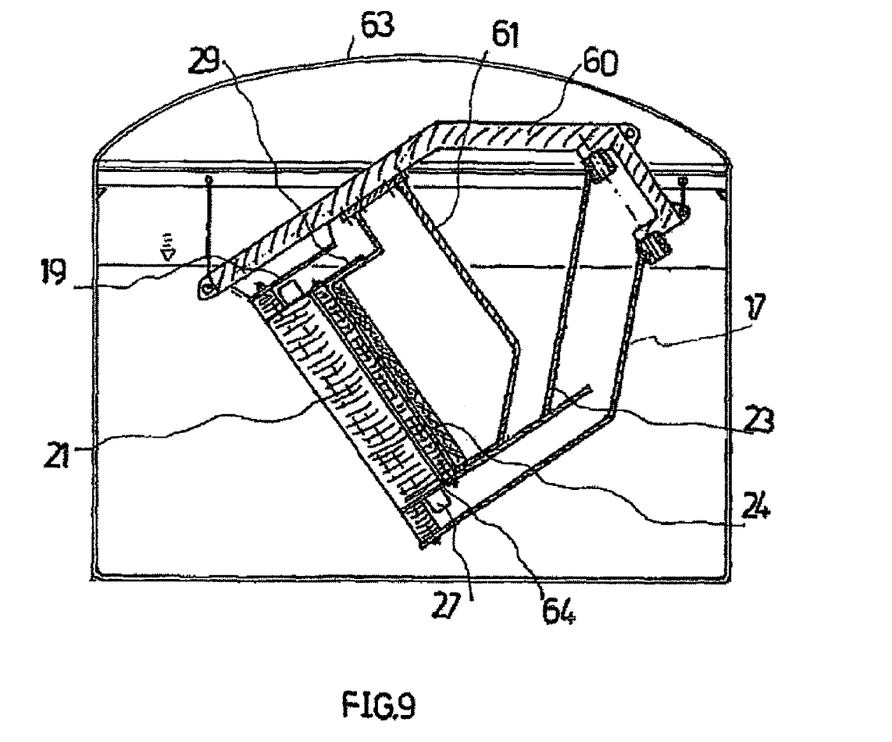
FIG. 9 is an illustration to explain the process of impregnation of the rotor and stator.

FIG. 9 shows joint impregnation, preferably in a vacuum, of the stator 16 and rotor 15, clamped on a common clamping apparatus 60. This clamping apparatus 60 has a moveable inner part 61, to which the rotor iron core 24, the rotor base plate 23 and the stiffening ring 29 are connected, and which will subsequently allow the stator 16 and rotor 15 to be removed easily for lacquering purposes. A spacer plate 64 of accurate dimensions and coated, for example, with Teflon is introduced into the air gap, and can easily be removed after the manufacturing step. The stator iron core 21 is held accurately in position by the magnetic forces of the rotor 15. The impregnation process is carried out in a pressure-resistant container 63 which is partially filled with resin.

The production of the stator 16 and rotor 15 in the described manner using the clamping apparatuses 47, 51 results in high-precision, largely self-supporting components. The accuracy of the air gap 25 is correspondingly high.

In the following figures, identical parts or parts having the same effect are annotated with the same reference number as in the previous figures, with the letter a in each case being added to the relevant reference number.

Figure 10:
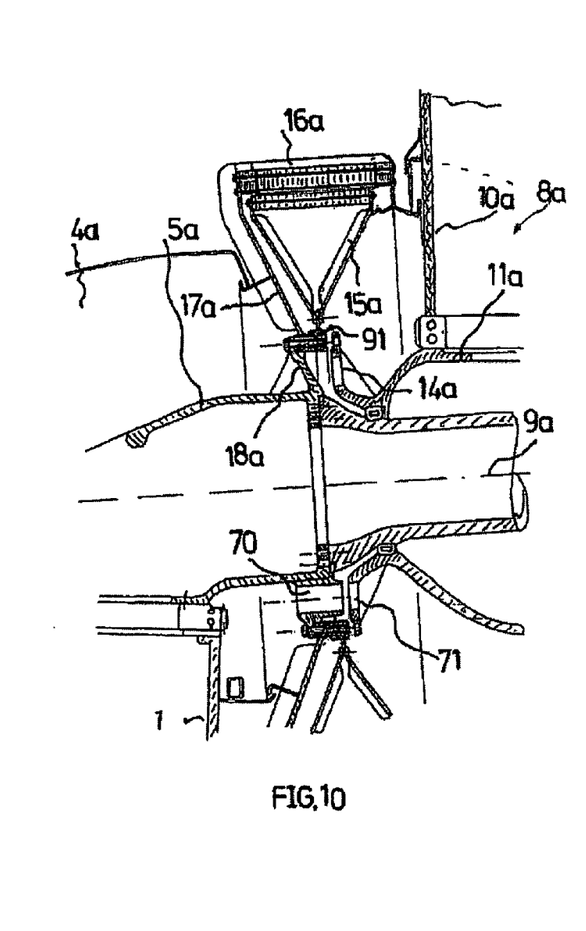
FIGS. 10 to 12 show sectioned partial illustrations of a wind energy installation with a second exemplary embodiment of a generator according to the invention.
Figure 11:
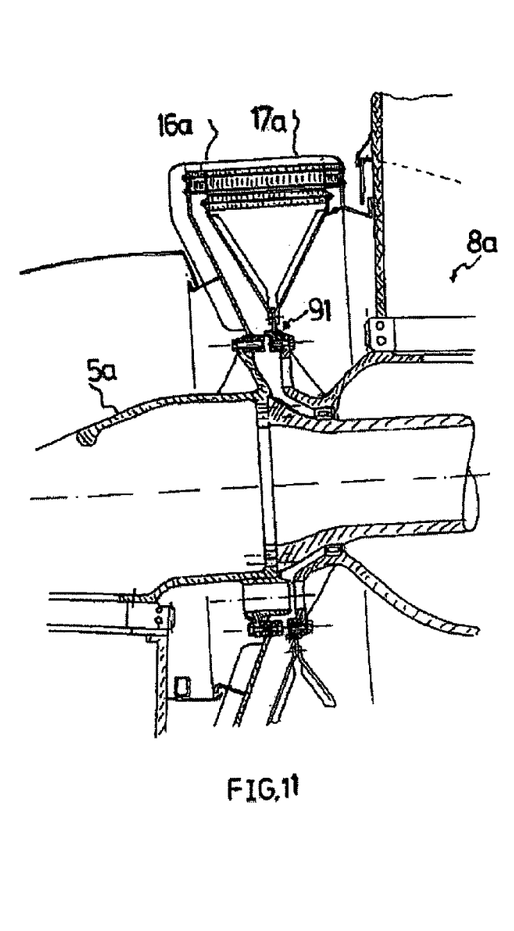
Figure 12:
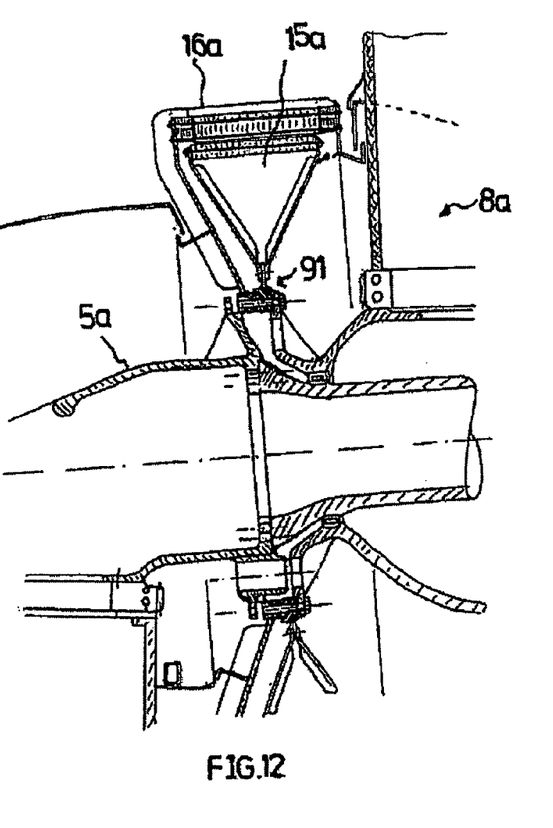

A wind energy installation as illustrated in the form of a sectioned partial view in FIGS. 10 to 12 and with a blade rotor 8a and a shaft body 5a comprises a device for locking the blade rotor 8a, wherein this device has a sleeve 70, which is connected to the shaft body 5a, for holding a locking bolt, and has an opening 71 in a flange 14a of a hub 11a of the blade rotor 8a.

A rotor 15a which can rotate within a stator 16a can be connected to the flange 14 as shown in FIG. 11 via a screw connecting device 91. As shown in FIG. 10, the rotor with the stator and the stator connected to the rotor can themselves be connected to the flange 18a via the screw connecting device 91. As shown in FIG. 12, the stator with the rotor and the rotor connected to the stator can themselves be connected to the flange 14a of the hub 11a of the blade rotor 8a via the screw connecting device 91.

Figures 14, 15, 16:
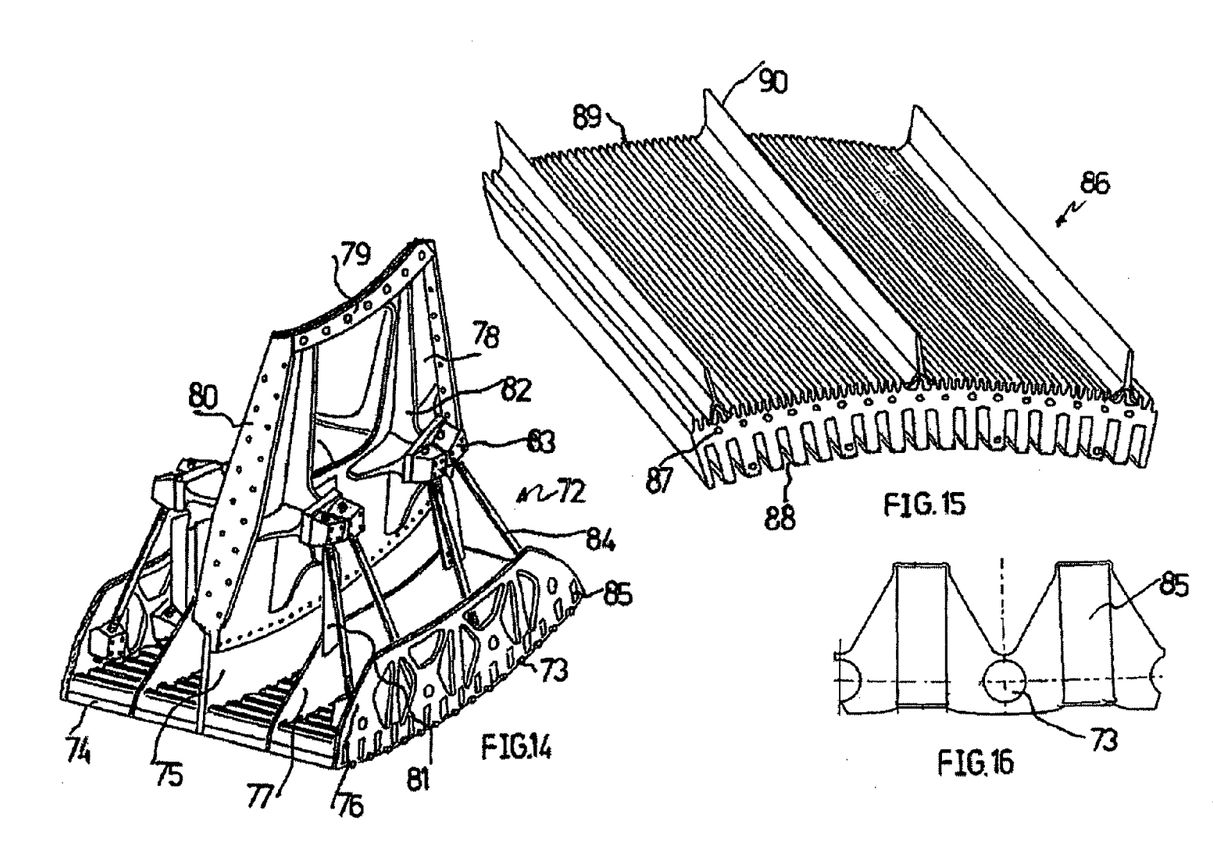

Both the stator 16a and the rotor 15a are composed of segments. FIG. 14 shows one rotor segment 72 which comprises a laminated core 74 which is held together by bolts 73 and has a center web 75, in the form of a plate, and outer webs 76. An intermediate web 77 in the form of a plate is in each case introduced into the laminated core between the center web and the outer webs.

The center web 75 merges into a supporting structure 78. An end piece 79, facing away from the laminated core 74, of the supporting structure 78 is used for connection to the flange 14a. The rotor segments 72 can be connected to one another via two-sided end pieces 80.

The intermediate webs 77 are each connected via connecting pieces 81 to a holder 82 which projects at the side from the supporting structure 78. There is in each case a connection between the outer webs 76 and the holders 82 via two threaded rods 84 which can be screwed into holding blocks 83 which are connected to the holders 82 and/or outer webs 86.

As can be seen in particular from FIG. 16, the laminated cores 74 have channels 85, which extend in the axial direction, for holding permanent-magnet bars. The geometry of the laminates surrounding the permanent-magnet bars is provided such that magnetic return paths through the soft-iron material of the laminates are avoided, and the magnetic flux which merges into the gap is optimized.

FIG. 15 shows a laminated core 86 for forming a stator segment. The laminates which are held together by bolts 87 form slots 88 for holding stator windings.

On the side facing away from the slots, the laminated core has axial grooves 89. Grooves are provided at intervals from one another, with additional depressions in which axial stiffening ribs 90 can latch. The stiffening ribs, which can be latched in elastically via spring forces, are preferably composed of pressed or drawn profiles.

The threaded rods 84 which form adjusting elements allow precise adjustment of the width of the air gap over the entire axial length of the rotor.

Figure 13:
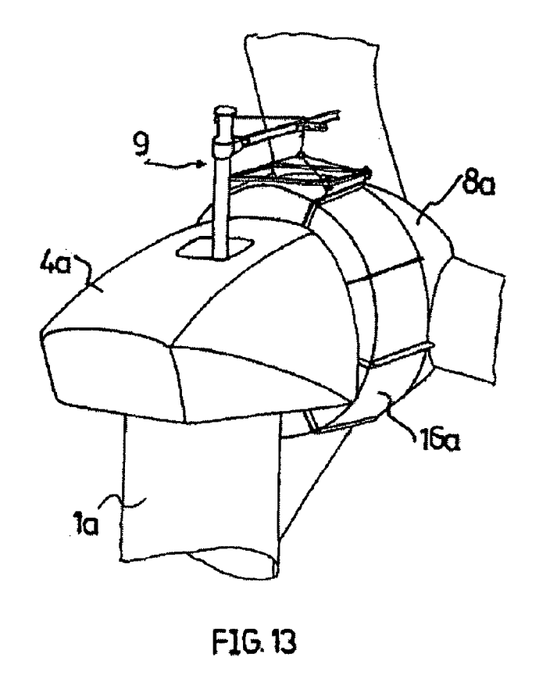
FIG. 13 shows a perspective view, obliquely from the rear, of the head part of the wind energy installation shown in FIGS. 10 to 12.

When a stator segment is defective, the stator 16a can be connected as shown in FIG. 12 to the rotor 15a and to the blade rotor 8a and can be rotated together with these parts until the relevant segment is aligned with a lifting device 92, which is shown in FIG. 13 and is arranged on the upper face of the pod housing 4a. In this position, the defective segment can be lifted out of the stator ring.

If a rotor segment is defective, then, as described above, a segment of the stator that is to be removed is first of all aligned precisely with the lifting device 92, and the stator is then screwed to the flange 18a as shown in FIG. 11. The defective rotor segment can then be rotated to a position in which it is aligned with the already aligned stator segment. The stator segment and the defective rotor segment are then successively lifted out of the stator ring or rotor ring by means of the lifting device 92.

The invention claimed is:

1. A generator for a wind energy installation comprising an inner rotor which has permanent magnets and has a direct drive connection to a blade rotor of the wind energy installation, and having a stator which has an iron core formed from laminate parts, the generator being formed without a supporting housing which completely surrounds the stator on the external circumference and the laminate parts of the stator are connected to one another by adhesive bonding and welding, and wherein the stator forms an outer ring which surrounds the inner rotor.

2. The generator as claimed in claim 1, wherein a laminated iron core is arranged between a base plate, which faces away from the blade rotor, and a stiffening ring, which faces the blade rotor and is coaxial with respect to the base plate and the laminated iron core.

3. The generator as claimed in claim 1, wherein a laminated iron core is formed in the end winding areas, leaving a space free for the end windings, by means of laminate segments which have no slots and teeth.

4. The generator as claimed in claim 2, wherein the base plate has a through-opening, which is coaxial with respect to the rotation axis of the rotor, for a shaft carrier, which holds the rotor and the blade rotor and has an attachment flange which can be placed against the edge of the opening.

5. The generator as claimed in claim 1, wherein the permanent magnets have a ferrite material, and the rotor preferably also has a laminated iron core with laminate parts which are connected to one another by adhesive bonding and/or welding.

6. The generator as claimed in claim 1, wherein the laminate parts of the stator and if appropriate of the rotor are furthermore connected by axial bolts.

7. The generator as claimed in claim 1, wherein the stator and if appropriate the rotor is or are formed from a plurality of parts, in particular two parts with half parts.

8. The generator as claimed in claim 7, wherein the half parts of the stator and of the rotor can be connected to one another, interleaved in one another, for transport purposes.

9. The generator as claimed in claim 1, wherein on an outside, the stator has cooling ribs which are integrally connected to the laminated iron core.

10. The generator as claimed in claim 1, wherein laminate layers of the stator and if appropriate of the rotor are composed of laminate segments which are placed one next to the other and are layered, with the laminate segments of successive laminate layers overlapping.

11. The generator as claimed in claim 1, wherein the number of winding slots of the laminated iron core, related to the number of poles and phases, is less than 1, preferably with the number of windings being minimized and with overlapping of phase connection sections being avoided.

12. The generator as claimed claim 1, wherein the generator windings are composed of aluminum wire.

13. A generator for a wind energy installation comprising:
an inner rotor which has permanent magnets and has a direct drive connection to a blade rotor of the wind energy installation; and
a stator which has an iron core formed from laminate parts connected to one another by adhesive bonding and welding so as to support the stator from within so as to maintain an air-gap geometry, the iron core comprising ribs; and
wherein the stator has an external side, and forms an outer ring which surrounds the inner rotor; and
wherein the generator is configured so that the ribs along the external side of the stator are uncovered so as to be open to an external environment of the generator along said external side, thereby allowing cooling of the stator by air from said external environment contacting said ribs.

* * * * *